Jan. 26, 1971     B. A. PALM     3,558,173
EQUALIZING HANGER BEAM

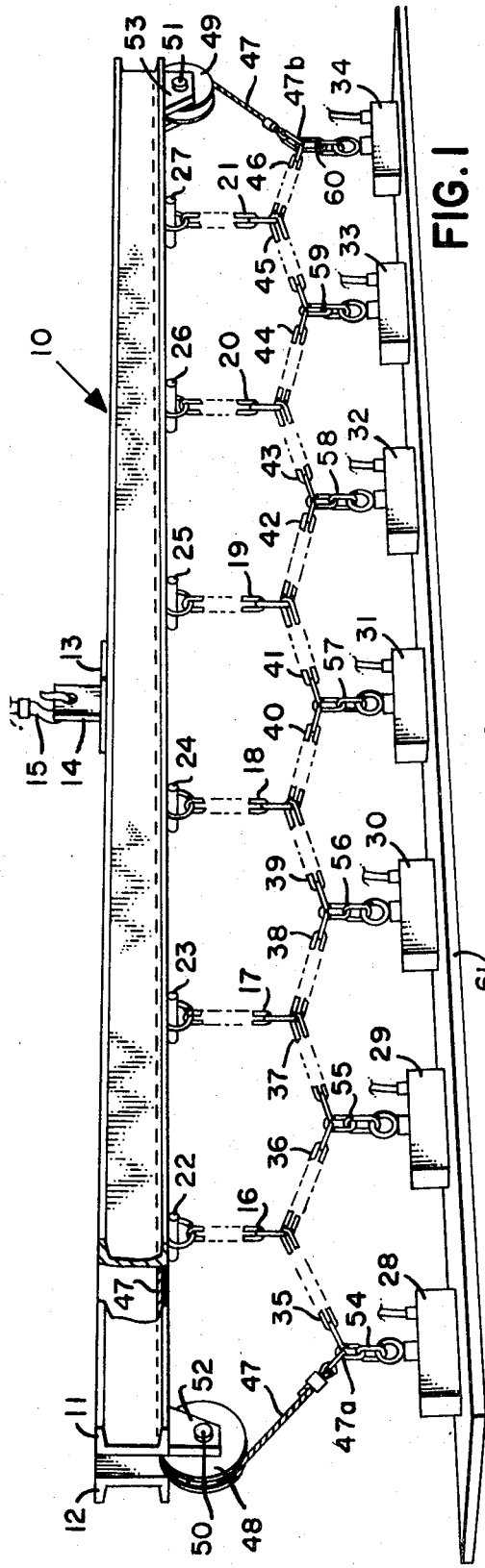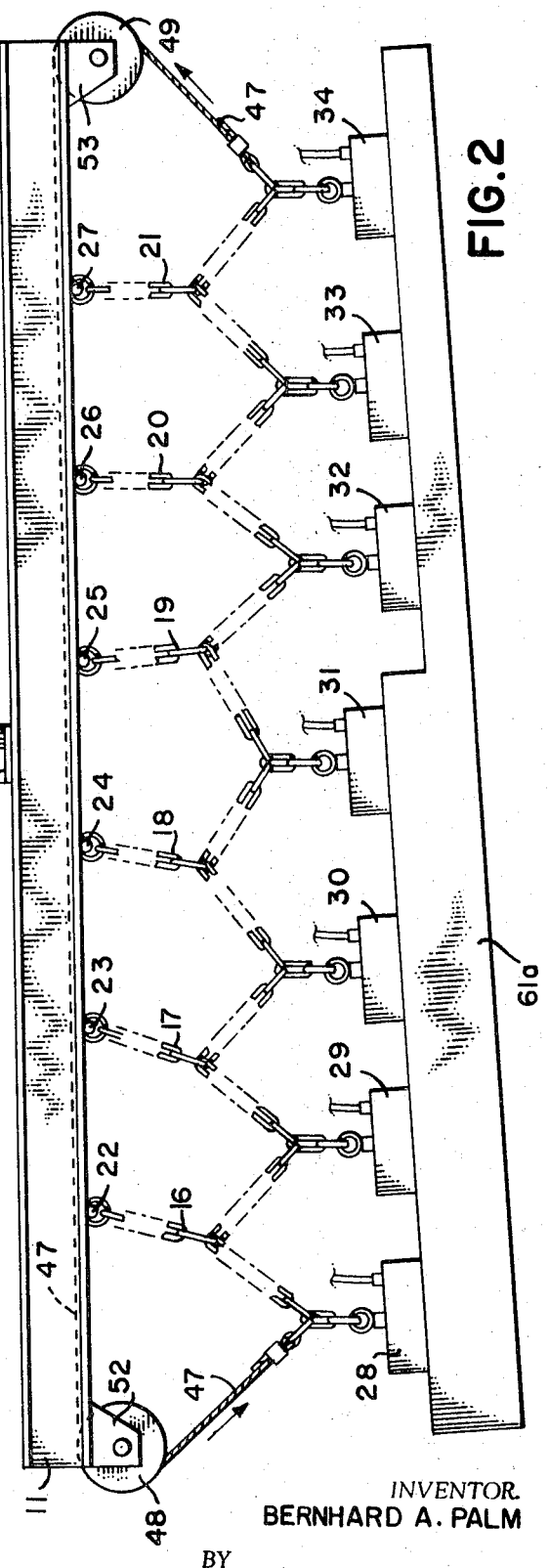

Filed Nov. 4, 1968     3 Sheets-Sheet 3

INVENTOR.
BERNHARD A. PALM
BY
ATTORNEYS

United States Patent Office 3,558,173
Patented Jan. 26, 1971

3,558,173
EQUALIZING HANGER BEAM
Bernhard A. Palm, Los Angeles, Calif., assignor to Buck Manufacturing Company, Los Angeles, Calif., a corporation of Delaware
Filed Nov. 4, 1968, Ser. No. 773,232
Int. Cl. B66c 1/02
U.S. Cl. 294—81                                7 Claims

ABSTRACT OF THE DISCLOSURE

An equalizing hanger beam arrangement employing a plurality of load gripping devices which may be either magnetic or vacuum, and which are supported from one or more beams or beam arrangement by a system of interconnected chains or similar flexible linkages that may assume various angular relationships with respect to each other depending upon the attitude or condition of the load gripped by the devices. In one embodiment selected ones of these linkages which are positioned adjacent the ends of the beam are connected to a cable or chain which is supported on the ends of the beam by sheaves or pivoted members thereby providing automatic adjustment of the end linkages of the hanger system.

---

This invention relates to the load lifting and supporting apparatus employing a beam and a plurality of load gripping devices supported from a beam arrangement by a chain or linkage system provided with automatic adjustment of the two end links thereof.

An object of this invention is to provide an improved load lifting and supporting apparatus employing a plurality of load gripping devices attached to one or more beams by a chain or linkage system adapted to adjust itself freely for proper load distribution among the load gripping devices.

Another object of this invention is to provide an improved load lifting and supporting apparatus employing a plurality of load gripping devices such as magnets or vacuum grips which are supported from one or more beams by an interconnected chain or linnage system which is adapted to assume various configurations as required for a proper load distribution among the various load gripping devices.

Still another object of this invention is to provide an improved load lifting and supporting apparatus employing a plurality of load gripping devices such as magnets or vacuum grips which are supported from a beam by a system of loose chains forming links between the load gripping devices and the beam, the end links of which are attached to the respective ends of a cable extending over the length of the beam and being supported thereon by sheaves attached to the ends of the beam.

Other and further objects of this invention will be apparent to those skilled in the art from the following specification, claims and drawing.

In accordance with this invention there is provided an equalizing hanger beam provided with a plurality of load gripping devices such as magnets or vacuum grips which are attached to one or more beams by a system of chains or other links. The elements of this system are interconnected to provide a desired load distribution among the various load gripping devices. This invention is an improvement over the self-equalizing multiple point lifting system disclosed in application Ser. No. 719,086 filed by Kenneth L. Gille and assigned to a common assignee. In one embodiment of the present system there is provided a cable between the load gripping devices located adjacent the ends of the beam, said cable passing over sheaves attached to the end portions of the beam so as to provide automatic adjustment of the end links of the hanger chain system. The present invention therefor provides an entirely loose hanger system which is essential for a proper load distribution among the several load gripping devices.

Further details will be set forth in the following specification, claims and drawings in which, briefly:

FIG. 1 is a perspective view partially broken away showing this equalizing hanger beam invention employing a plurality of load gripping devices engaging and supporting a relatively long and thin member of relatively uniform cross section;

FIG. 2 is a side view showing the load gripping devices engaging and supporting an irregular member and showing the relative angular configuration assumed by the various links of the hanger chain system;

Figure 3:
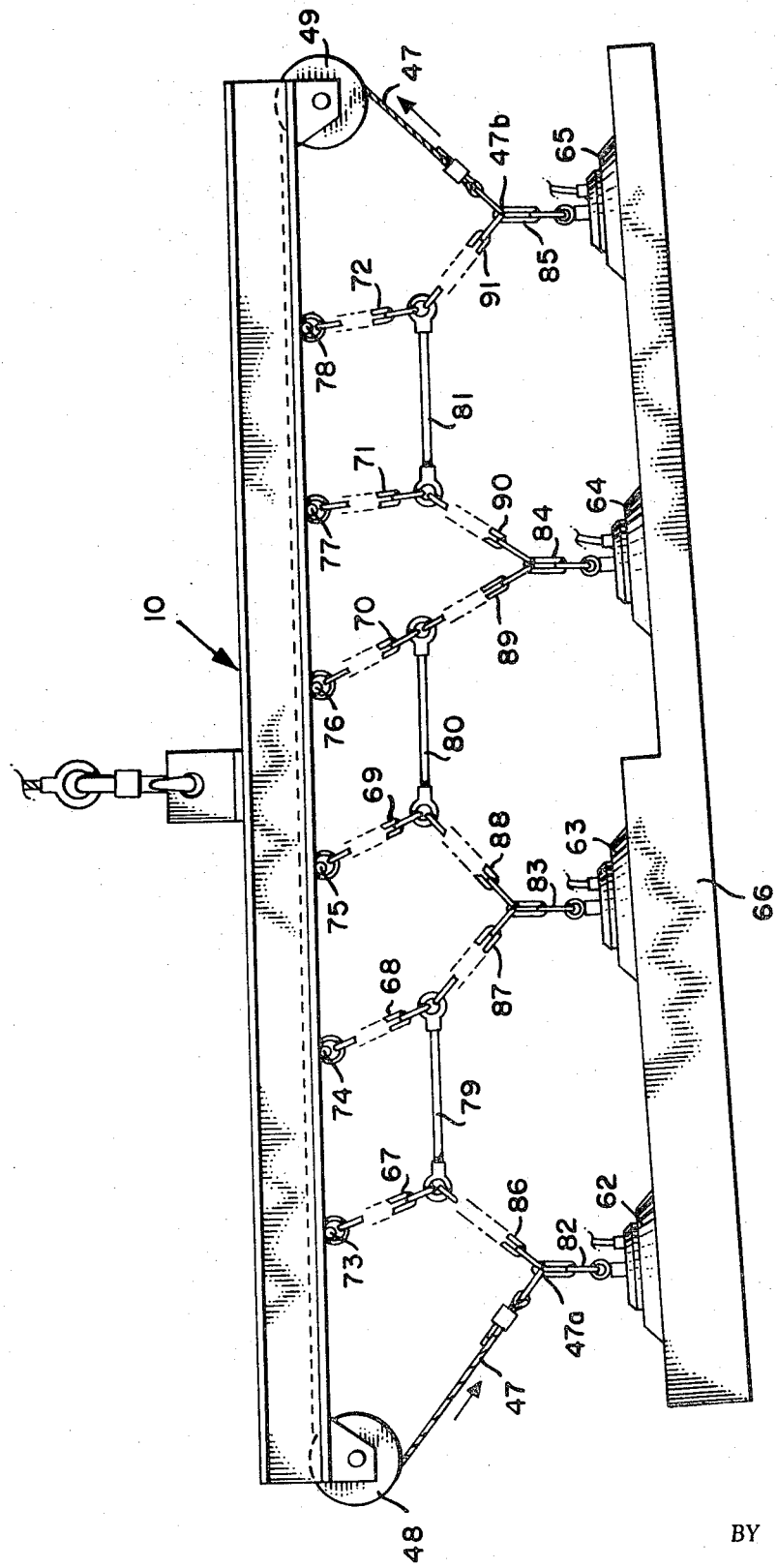
FIG. 3 is a side view of an embodiment of this invention in which the hanger chain system is provided with relatively rigid links connected between selected chain or flexible links of the system.

Referring to the drawing in detail, reference numeral 10 designates a rigid member beam made of channel members 11 and 12 which are positioned in parallel spaced relation and which are bridged by a plate 13 welded, or otherwise attached, to the central top parts thereof. The beam 10 may be made of one or more elongated rigid members other than the channel members 11 and 12 illustrated in the drawing or it may be made of a plurality of spaced members so that the frame is more or less rectangular in shape, if desired.

A vertical member 14 is attached to the plate 13 by welding or the like, and this member is provided with a hole for receiving the supporting hook 15 which may be attached to a suitable hoist (not shown). Substantially vertically disposed chains 16 to 21, inclusive, are attached to the substantially uniformly spaced members 22 to 27, inclusive, respectively, which are attached by welding or the like to the bottom surfaces of the channel members 11 and 12. Load gripping devices 28 to 34, inclusive, are supported from the beam 10 by means of a chain linkage system including the substantially vertical chain linkages 16 to 21, inclusive, and the angularly disposed chain linkages 35 to 46, inclusive, as well as the cable 47. Short chain links 54 to 60, inclusive, are attached to suitable loops provided to the upper parts of load gripping devices 28 to 34, inclusive, respectively.

The upper links of the chains 54 to 60, inclusive, are attached to the flexible chain supporting system in the following manner. Chain 54 is attached to the end 47a of the cable 47 and to the bottom end of linkage 35; chain 55 is attached to the bottom ends of linkages 36 and 37; chain 56 is attached to the bottom ends of linkages 38 and 39; chain 57 is attached to the bottom ends of linkages 40 and 41; chain 58 is attached to the bottom ends of linkages 42 and 43; chain 59 is attached to the bottom ends of linkages 44 and 45; chain 60 is attached to the bottom end of linkage 46 and to the end 47b of the cable 47.

The upper ends of the linkages 45 and 46, inclusive, are paired and attached to the bottom ends of vertical linkages 16 to 21, inclusive, as follows: pair 35–36 is attached to linkage 16; pair 37–38 is attached to linkage 17; pair 39–40 is attached to linkage 18; pair 41–42 is attached to linkage 19; pair 43–44 is attached to linkage 20 and pair 45–46 is attached to linkage 21.

The cable 47 which extends between the linkages 54 and 60 is supported on the beam 10 by sheaves 48 and 49. These sheaves 48 and 49 are rotatable on the pivot pins 50 and 51, respectively, which are supported on the beam by depending members 52 and 53, respectively, which are welded to the beam. Two depending members 52 are provided one on each side of each sheave 48 and two depending members 53 are provided one on each side of sheave 49. In each case one of these members is welded or otherwise attached to the beam member 11 and the other of these members is welded or otherwise attached to the beam member 12. Thus, the sheaves 48 and 49 are rotatable therebetween and the cable 47 is movable thereover during the load equalizing process.

A load such as the member 61 is gripped by the gripping devices 28 to 34, inclusive, which may be either suitable electromagnetic devices or vacuum devices of conventional construction. If the load 61 is essentially uniform as shown in FIG. 1, then the various linkages of the flexible chain supporting system will assume a regular pattern, if on the other hand the load is not regular and uniformly distributed then the various linkages assume an irregular configuration. For an irregular load 61a such as shown in FIG. 2, for example, the various linkages of the chain supporting system assume a somewhat irregular pattern since the left-hand part of the load 61a is more bulky than the right hand part and the flexible chain supporting system is endeavoring to equalize the load distribution among the various load gripping devices. In this case the flexible cable or chain 47 transmits a pulling force from the left hand side of the flexible chain linkage to the right hand side.

The various linkages 16 to 21, inclusive, and 35 to 46, inclusive, as well as the flexible member 47 may be either chain linkages or flexible cables as desired. On the other hand since members 16 to 21 and 35 to 46, inclusive, are always under various degrees of tension it is possible to substitute rigid members of predetermined lengths therefor. The cable or chain 47 must, of course, always be flexible, that is at least the end portions thereof which are in engagement with the sheaves 48 and 49 must be flexible while the portion thereof extending over the major length of the beam 10 may be in the shape of a rod having a certain amount of rigidity.

In FIG. 3 there is illustrated an embodiment of this invention employing only four load gripping devices 62, 63, 64 and 65 engaging a load 66 of irregular shape. This embodiment of the invention also employs a beam 10 which is constructed the same as beam 10 shown in FIGS. 1 and 2, and it is provided with sheaves 48 and 49 at the ends thereof for supporting the flexible cable 47. Substantially vertical linkages 67 to 72, inclusive, are attached to the bottom surfaces of the beam 10 by welding or the like. Relatively rigid links 79, 80 and 81 are connected to the bottom ends of the vertical linkage pairs 67–68, 69–70, and 71–72, respectively.

Short vertical linkages 82, 83, 84 and 85 are attached to the top portions of load gripping devices 62, 63, 64, and 65, respectively, and the top ends of these linkages are attached to the supporting linkage system in the following manner. The top of linkage 82 is attached to the end 47a of the cable 47 and to the bottom of linkage 86. The top of linkage 86 is attached to the left hand end of the rigid member 79 and to the bottom of vertical linkage 67. The top of linkage 83 is attached to the bottom ends of linkages 87 and 88; the top end of linkage 84 is attached to the bottom ends of linkages 89 and 90, and the top end of linkage 85 is attached to the bottom end of linkage 91 and to the end 47b of cable 47. The top end of linkage 87 is attached to the bottom of linkage 68 and to the right hand end of member 79 and the top end of linkage 88 is attached to the bottom of linkage 69 and to the left hand end of rigid member 80. Likewise, the top ends of linkages 89 and 90 are attached to the right-hand end of rigid member 80 and left-hand end of rigid member 81 respectively, and to the bottom ends of linkages 70 and 71, respectively. The right hand end of rigid member 81 is attached to the top of linkage 91 and to the bottom of linkage 72. Thus, in this modification of the invention there is provided a load gripping device suspension system which also tends to equalize the load among the various gripping devices in a manner similar to that shown in FIGS. 1 and 2. The action of the system shown in FIG. 3 may be compared to that shown in FIG. 1 by assuming that the arrangement shown in FIG. 1 were modified by eliminating alternate load-gripping devices 29, 31 and 33. In such a modification the linkages 36 and 37 would correspond to the member 79 and in such event, of course, these linkages 36 and 37 would have to be made of the same length as member 79. Likewise, linkages 40–41 and 44–45 would correspond to members 80 and 81 and would also have to be made of the same lengths as these members.

Figure 4:
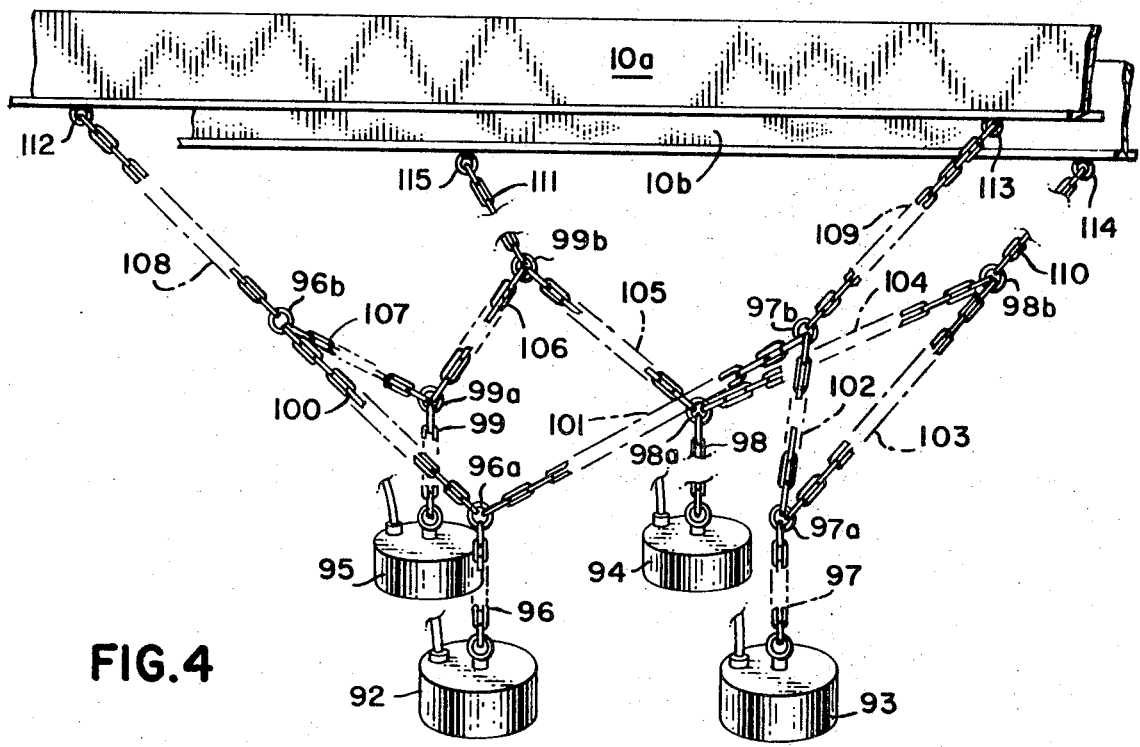
FIG. 4 is a side view of another embodiment of this invention in which the hanger chain system is provided with a flexible loop of interconnected links.

The embodiment of this invention as shown in FIG. 4 employs four load gripping devices 92, 93, 94, 95 which may be either of the electromagnetic or vacuum type. More or less than four of these devices may be employed if desired, and the chain supporting system by means of which these devices are suspended from the beams 10a and 10b may be reduced or enlarged accordingly. The beams 10a and 10b may be separate members or they may be parts of a substantially rectangular beam arrangement or structure which is adapted to be supported from a suitable hoist, crane or other conventional apparatus.

The load gripping devices 92, 93, 94, 95 are attached to suitable chains or cables 96, 97, 98 and 99, respectively. A loop of flexible cable or chain linkages 100 to 107, inclusive, is provided with attaching points or links 96a, 97a, 98a, and 99a to which the linkages 96, 97, 98, and 99, respectively, are attached. The loop of flexible linkages 100 to 107, inclusive, is provided with additional points 96b, 97b, 98b and 99b which are spaced between the above mentioned points as shown in the drawing. It will be noted that the linkages 100 to 107, inclusive, are all of substantially the same length and of course this may be varied as desired. The load gripping device chain supporting system is provided with additional linkages 108, 109, 110 and 111 which are also all of substantially the same length and which, of course, may also be varied as desired. Linkages 108, 109, 110 and 111 are attached to the beam system at points 112, 113, 114 and 115, respectively, and they are attached to the aforementioned loop 100–107 at points 96b, 97b, 98b, and 99b, respectively.

Figure 5:
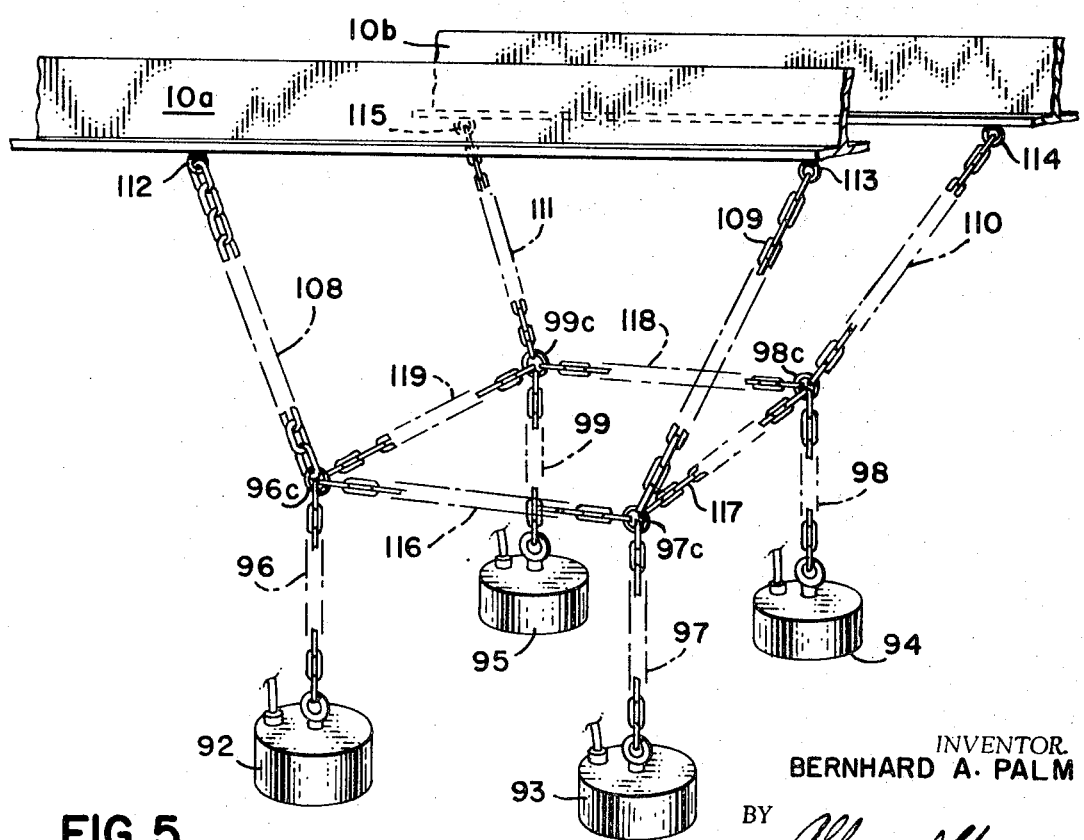
FIG. 5 is a side view of another embodiment of this invention which is similar to that shown in FIG. 4.

The load gripping devices 92, 93, 94, 95 shown in FIG. 5 are also attached to the lower ends of the linkages 96, 97, 98 and 99, respectively, similarly to the arrangement shown in FIG. 4. However, in FIG. 5 the loop of flexible members 116, 117, 118, 119 is substituted for the loop including members 100 to 107, inclusive, shown in FIG. 4. The loop including members 116 to 119 is provided with connecting points 96c, 97c, 98c and 99c to which the linkages 96, 97, 98 and 99, respectively, are connected and also to which the linkages 108, 109, 110 and 111, respectively, are connected.

While I have shown a preferred embodiment of this invention, it will be understood that the invention is capable of variation and modification from the form shown so that the scope thereof should be limited only by the proper scope of the claims appended hereto.

What I claim is:

1. In a self equalizing multiple point lifting system adapted to support a plurality of load gripping devices for lifting and supporting loads which may comprise flat, round or irregular objects gripped by said devices, the combination of substantially rigid beam means, means supporting said beam means substantially horizontally, a plurality of load gripping devices, means freely supporting said load gripping devices from said beam means, said last mentioned supporting means including a continuous loop of linkages, at least some of said linkages in said loop being flexible, means attaching said loop to said beam means at spaced points and including means attaching selected ones of said load gripping devices to different spaced points of said continuous loop, said linkages forming said loop being freely movable within predetermined limits.

2. In a self equalizing multiple point lifting system adapted to support a plurality of load gripping devices for lifting and supporting loads which may comprise flat, round or irregular objects gripped by said devices, the combination as set forth in claim 1, further characterised in that said continuous loop of linkages includes a movable linkage extending from one end of said beam means to the other.

3. In a self equalizing multiple point lifting system adapted to support a plurality of load gripping devices for lifting and supporting loads which may comprise flat, round or irregular objects gripped by said devices, the combination as set forth in claim 2, further characterised in that said movable linkage having flexible end portions supported on the ends of said beam means by sheaves.

4. In a self equalizing multiple point lifting system adapted to support a plurality of load gripping devices for lifting and supporting loads which may comprise flat, round or irregular objects gripped by said devices, the combination as set forth in claim 1, further characterised in that said last mentioned supporting means includes a plurality of substantially vertically disposed linkages attached to said beam means at said spaced points.

5. In a self equalizing multiple point lifting system adapted to support a plurality of load gripping devices for lifting and supporting loads which may comprise flat, round or irregular objects gripped by said devices, the combination as set forth in claim 4, further characterised in that said vertically disposed linkages are attached to said loop of linkages at spaced points which alternate with said different spaced points.

6. In a self equalizing multiple point lifting system adapted to support a plurality of load gripping devices for lifting and supporting loads which may comprise flat, round or irregular objects gripped by said devices, the combination as set forth in claim 5, further characterised in that said continuous loop of linkages includes a movable linkage extending from one end of said beam means to the other, said movable linkage including flexible end portions supported on the ends of said beam means by sheaves.

7. In a self equalizing multiple point lifting system adapted to support a plurality of load gripping devices for lifting and supporting loads which may comprise flat, round or irregular objects gripped by said devices, the combination as set forth in claim 1, further characterised in that selected ones of said linkages of said loop being flexible and other selected ones of said linkages being susbtantially rigid.

References Cited

UNITED STATES PATENTS

| | | | |
|---|---|---|---|
| 2,780,487 | 2/1957 | Bredensteiner et al. | 294—81 |
| 3,410,594 | 11/1968 | Albrecht | 294—81 |

FOREIGN PATENTS

| | | | |
|---|---|---|---|
| 1,207,580 | 12/1965 | Germany | 294—81 |

EVON C. BLUNK, Primary Examiner

R. S. GAITHER, Assistant Examiner

U.S. Cl. X.R.

294—67